United States Patent
Takahashi et al.

(10) Patent No.: US 8,676,207 B2
(45) Date of Patent: Mar. 18, 2014

(54) MOBILE COMMUNICATION METHOD

(75) Inventors: Hideaki Takahashi, Tokyo (JP); Wuri Andarmawanti Hapsari, Tokyo (JP); Anil Umesh, Tokyo (JP); Mikio Iwamura, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 13/805,721

(22) PCT Filed: Jun. 20, 2011

(86) PCT No.: PCT/JP2011/064067
§ 371 (c)(1),
(2), (4) Date: Mar. 12, 2013

(87) PCT Pub. No.: WO2011/162208
PCT Pub. Date: Dec. 29, 2011

(65) Prior Publication Data
US 2013/0171992 A1 Jul. 4, 2013

(30) Foreign Application Priority Data
Jun. 21, 2010 (JP) ................ P2010-141110

(51) Int. Cl.
*H04W 36/00* (2009.01)
(52) U.S. Cl.
USPC ........... 455/436; 455/438; 455/442; 455/443; 370/331
(58) Field of Classification Search
USPC ............. 455/436, 438, 442, 443; 370/331
See application file for complete search history.

(56) References Cited

U.S. PATENT DOCUMENTS

2009/0046656 A1 * 2/2009 Kitazoe et al. ............. 370/331

FOREIGN PATENT DOCUMENTS

| EP | 2 187 672 A1 | 5/2010 |
| JP | 2010-21890 A | 1/2010 |
| WO | 2008/157717 A1 | 12/2008 |

OTHER PUBLICATIONS

International Search Report issued in PCT/JP2011/064067 mailed Jul. 12, 2011 (4 pages).
Ericsson; "Connected mode measurement configuration procedure in RRC"; 3GPP TSG-RAN WG2 #59, R2-073244; Athens, Greece; Aug. 20-24, 2007 (4 pages).
3GPP TR 36.805 V9.0.0; "3rd Generation Partnership Project; Technical Specification Group Radio Access Network; Study on Minimization of drive-tests in Next Generation Networks; (Release 9)"; Dec. 2009 (24 pages).

(Continued)

*Primary Examiner* — Justin Lee
(74) *Attorney, Agent, or Firm* — Osha Liang LLP

(57) ABSTRACT

A mobile communication method according to the present invention is a mobile communication method in which a mobile station is handed over from a cell #B and is subordinate to a radio base station to a cell #C and is subordinate to a radio base station, and includes a step of transmitting "Measurement Configuration" for instructing to measure and report a desired radio quality to the mobile station, a step of transmitting, by the radio base station, "HO Request", which includes identification information assigned to the cell #B, to the radio base station, a step of transmitting, by the radio base station, "HO Request Ack" including "HO Command" not including "Measurement Configuration" to the radio base station in response to the identification information assigned to the cell #B, and a step of transmitting, by the radio base station, the "HO Command" to the mobile station.

4 Claims, 3 Drawing Sheets

(56) References Cited

OTHER PUBLICATIONS

3GPP TS 37.320 V10.0.0; "3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2 (Release 10)"; Dec. 2010 (17 pages).

3GPP TS 32.422 V10.2.1; "3rd Generation Partnership Project; Technical Specification Group Services and System Aspects; Telecommunication management; Subscriber and equipment trace; Trace control and configuration management (Release 10)"; Jan. 2011 (106 pages).

Japanese Office Action in corresponding Japanese Application No. 2010-141110 mailed on Jul. 12, 2011 (6 pages).

Japanese Office Action in corresponding Japanese Application No. 2010-141110 mailed on Oct. 18, 2011 (7 pages).

Notice of Grounds for Rejection in corresponding Korean application No. 10-2012-7033794 dated Jun. 13, 2013 (5 pages).

3GPP TS 36.300 V8.8.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description: Stage 2 (Release 8)"; Mar. 2009 (10 pages).

Extended European Search Report for corresponding European Application No. 11798092.0, mailed Sep. 18, 2013 (14 pages).

NTT DoCoMo, Inc.; "MDT Context handling during handover;" 3GPP TSG-RAN2#69bis, R2-102444; Beijing, China; Apr. 12-16, 2010 (2 pages).

\* cited by examiner

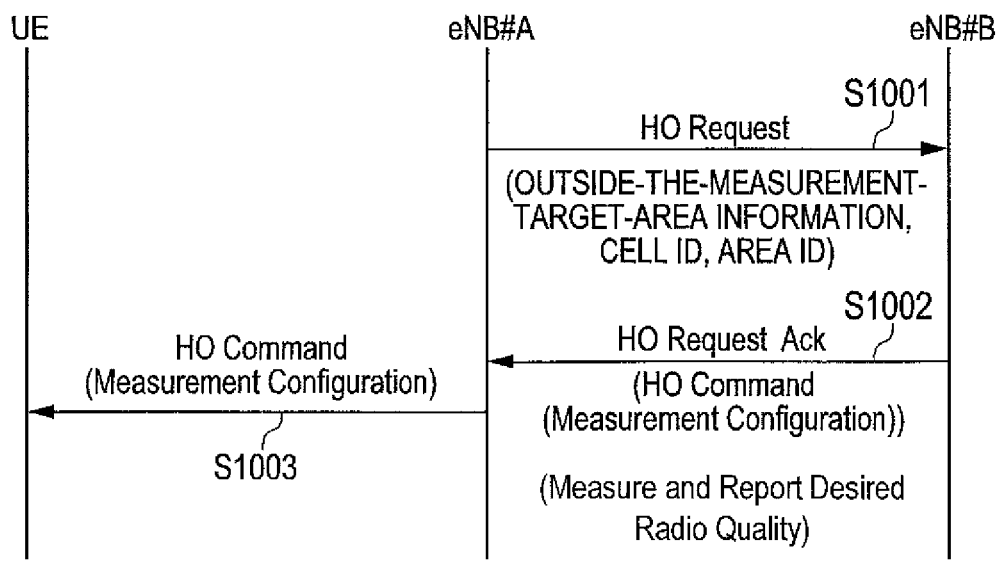
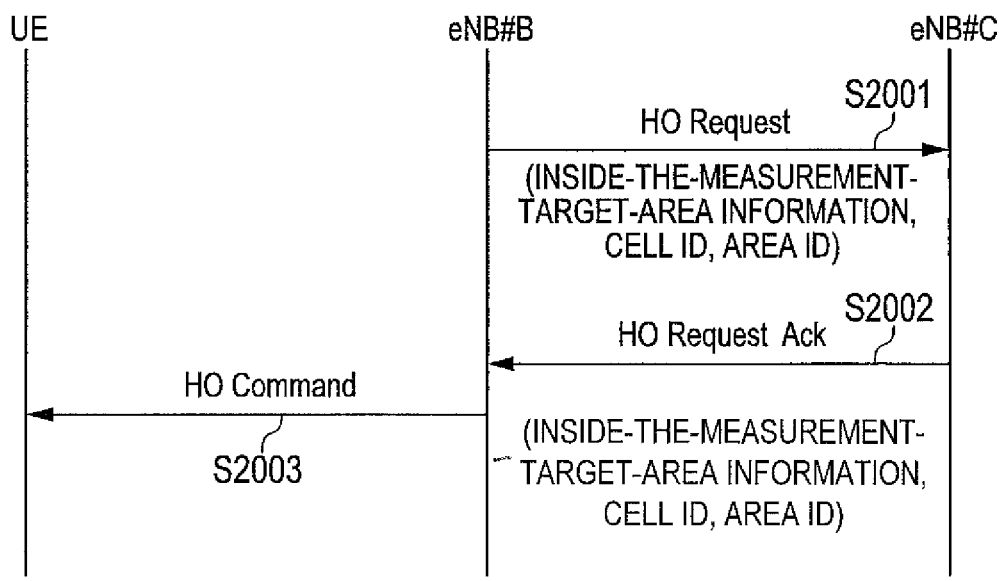

MOBILE COMMUNICATION METHOD

TECHNICAL FIELD

The present invention relates to a mobile communication method.

BACKGROUND ART

In 3GPP, there has been discussed a technique called "MDT (Minimisation of Drive Tests)" in which a specific mobile station UE is caused to measure and report a desired radio quality.

CITATION LIST

Non Patent Literature

[NPL 1] 3GPP TR36.805, "Evolved Universal Terrestrial Radio Access (E-UTRA); Study on minimization of drive-tests in next generation networks"
[NPL 2] 3GPP TS37.320, "Radio measurement collection for MDT"

However, the MDT does not stipulate a method in which an unspecific mobile station UE in a specific area is caused to measure and report a desired radio quality.

Therefore, the present invention has been achieved in view of the above-described problems, and an object thereof is to provide a mobile communication method with which it is possible to make an unspecific mobile station UE in a specific area to measure and report a desired radio quality.

SUMMARY OF THE INVENTION

A first characteristic of the present invention is summarized in that a mobile communication method, in which a mobile station is handed over from a first cell that lies outside an measurement-target area and is subordinate to a first radio base station to a second cell that lies inside the measurement-target area and is subordinate to a second radio base station, includes: a step A of transmitting, by the first radio base station, a handover request signal to the second radio base station; a step B of transmitting, by the second radio base station, a handover request response signal, which includes a handover instruction signal including instruction information for instructing to measure and report a desired radio quality, to the first radio base station; and a step C of transmitting, by the first radio base station, the handover instruction signal to the mobile station.

A second characteristic of the present invention is summarized in that a mobile communication method, in which a mobile station is handed over from a first cell that lies inside an measurement-target area and is subordinate to a first radio base station to a second cell that lies inside the measurement-target area and is subordinate to a second radio base station, includes: a step of transmitting instruction information for instructing to measure and report a desired radio quality to the mobile station; a step of transmitting, by the first radio base station, a handover request signal, which includes inside-the-measurement-target-area information indicating that the first cell is a cell that lies inside the measurement-target area, to the second radio base station; a step of transmitting, by the second radio base station, a handover request response signal including a handover instruction signal not including the instruction information to the first radio base station in response to the inside-the-measurement-target-area information; and a step of transmitting, by the first radio base station, the handover instruction signal to the mobile station.

A third characteristic of the present invention is summarized in that a mobile communication method, in which a mobile station is handed over from a first cell that lies inside an measurement-target area and is subordinate to a first radio base station to a second cell that lies inside the measurement-target area and is subordinate to a second radio base station, includes: a step of transmitting instruction information for instructing to measure and report a desired radio quality to the mobile station; a step of transmitting, by the first radio base station, a handover request signal, which includes identification information assigned to the first cell, to the second radio base station; a step of transmitting, by the second radio base station, a handover request response signal including a handover instruction signal not including the instruction information to the first radio base station in response to the identification information assigned to the first cell; and a step of transmitting, by the first radio base station, the handover instruction signal to the mobile station.

A fourth characteristic of the present invention is summarized in that a mobile communication method, in which a mobile station is handed over from a first cell that lies inside an measurement-target area and is subordinate to a first radio base station to a second cell that lies outside the measurement-target area and is subordinate to a second radio base station, includes: a step A of transmitting, by the first radio base station, a handover request signal to the second radio base station; a step B of transmitting, by the second radio base station, a handover request response signal, which includes a handover instruction signal including instruction information for instructing to stop measuring and reporting a desired radio quality, to the first radio base station; and a step C of transmitting, by the first radio base station, the handover instruction signal to the mobile station.

As described above, according to the present invention, it is possible to provide a mobile communication method with which it is possible to cause an unspecific mobile station UE in a specific area to measure and report a desired radio quality.

BRIEF DESCRIPTION OF DRAWINGS

FIG. 3 is a sequence diagram illustrating the operation of the mobile communication system according to the first embodiment of the present invention.

FIG. 4 is a sequence diagram illustrating the operation of the mobile communication system according to the first embodiment of the present invention.

DESCRIPTION OF EMBODIMENTS

Mobile Communication System According to First Embodiment of the Present Invention A mobile communication system according to a first embodiment of the present invention is described with reference to FIG. 1 through FIG. 5.

Figure 1:
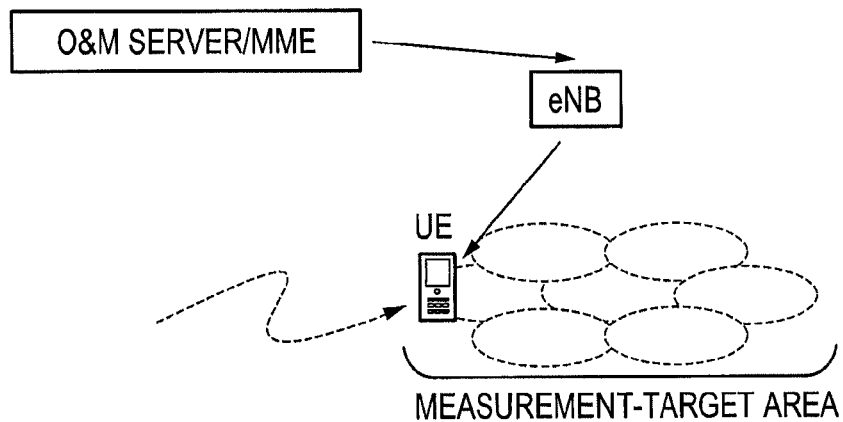
FIG. 1 is a diagram illustrating the entire configuration of a mobile communication system according to a first embodiment of the present invention.

As illustrated in FIG. 1, the mobile communication system according to the present embodiment includes an O&M (Operation & Maintenance) server, a mobile management node MME (Mobility Management Entity), and a radio base station eNB.

The mobile communication system according to the present embodiment is configured such that an unspecific mobile station UE in a cell in an measurement-target area is caused to measure and report a desired radio quality.

Figure 2:
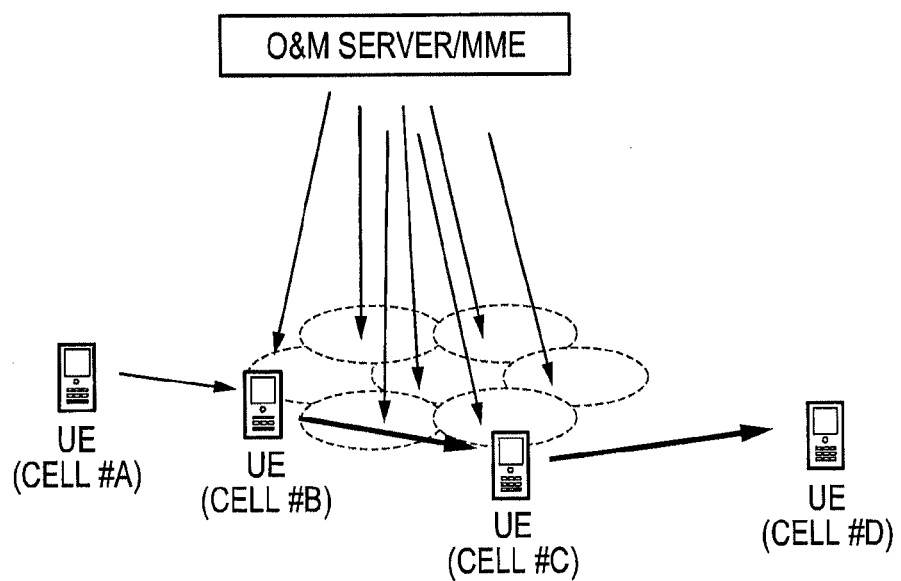
FIG. 2 is a diagram explaining the operation of the mobile communication system according to the first embodiment of the present invention.

As illustrated in FIG. 2, the O&M server or the mobile management node MME is configured to set in advance an "area ID" for identifying the measurement-target area, a "cell ID (CGI (Cell Global Identity), PCI (Physical Cell Identity) and the like)" for identifying a cell included inside the measurement-target area, a desired radio quality to be measured as MDT, a method of reporting a measurement result in the MDT, and the like with respect to a radio base station that manages a cell that lies inside the measurement-target area.

Hereinafter, with reference to FIG. 3 through FIG. 5, the operation of the mobile communication system according to the present embodiment will be described.

Firstly, with reference to FIG. 3, a description will be provided for an operation of the mobile communication system according to the present embodiment when the mobile station UE is handed over from a cell #A that lies outside an measurement-target area and is subordinate to a radio base station eNB#A to a cell #B that lies inside the measurement-target area and is subordinate to a radio base station eNB#B.

As illustrated in FIG. 3, when the mobile station UE is in an RRC_Connected state in the cell #A, the radio base station eNB#A transmits "HO Request" to the radio base station eNB#B in step S1001.

Furthermore, the radio base station eNB#A may transmit outside-the-measurement-target-area information, which indicates that the cell #A is a cell that lies outside the measurement-target area, to the radio base station eNB#B through the "HO Request".

Alternatively, the radio base station eNB#A may transmit identification information (for example, a cell ID and an area ID) assigned to the cell #A to the radio base station eNB#B through the "HO Request".

In step S1002, the radio base station eNB#B generates "HO Command" to be transmitted to the mobile station UE in response to the received "HO Request", and transmits "HO Request Ack" including the "HO Command" to the radio base station eNB#A.

Furthermore, the radio base station eNB#B detects that the cell #A is a cell that lies outside the measurement-target area, based on the outside-the-measurement-target-area information or the identification information assigned to the cell #A.

As a consequence, the radio base station eNB#B generates "Measurement Configuration" for instructing to measure and report a desired radio quality, and transmits the "Measurement Configuration" to the radio base station eNB#A through the "HO Command" in the "HO Request Ack".

In step S1003, the radio base station eNB#A transmits the "HO Command" including the "Measurement Configuration" to the mobile station UE.

As a consequence, the mobile station UE is handed over to the cell #B inside the measurement-target area, based on the "Measurement Configuration", and then measures and reports the desired radio quality.

Secondly, with reference to FIG. 4, a description will be provided for an operation of the mobile communication system according to the present embodiment when the mobile station UE is handed over from the cell #B that lies inside the measurement-target area and is subordinate to the radio base station eNB#B to cell #C that lies inside the measurement-target area and is subordinate to a radio base station eNB#C.

As illustrated in FIG. 4, when the mobile station UE is in an RRC_Connected state in the cell #B, the radio base station eNB#B transmits "HO Request" to the radio base station eNB#C in step S2001.

Furthermore, the radio base station eNB#B may transmit inside-the-measurement-target-area information, which indicates that the cell #B is a cell that lies inside the measurement-target area, to the radio base station eNB#C through the "HO Request".

Alternatively, the radio base station eNB#B may transmit identification information (for example, a cell ID and an area ID) assigned to the cell #B to the radio base station eNB#C through the "HO Request".

In step S2002, the radio base station eNB#C generates "HO Command" to be transmitted to the mobile station UE in response to the received "HO Request", and transmits "HO Request Ack" including the "HO Command" to the radio base station eNB#B.

Furthermore, the radio base station eNB#B detects that the cell #B is a cell that lies inside the measurement-target area, based on the inside-the-measurement-target-area information or the identification information assigned to the cell #B.

In addition, when the cell #B and the cell #C exist in the same measurement-target area and there is no change point in an information element in the "Measurement Configuration", the radio base station eNB#C may not transmit the "Measurement Configuration" to the radio base station eNB#B through the "HO Command" in the "HO Request Ack".

In step S2003, the radio base station eNB#B transmits the "HO Command" included in the "HO Request Ack" to the mobile station UE.

As a consequence, the mobile station UE is handed over to the cell #C inside the measurement-target area, and then measures and reports the desired radio quality as much in the same way as in the case of the cell #C.

Figure 5:
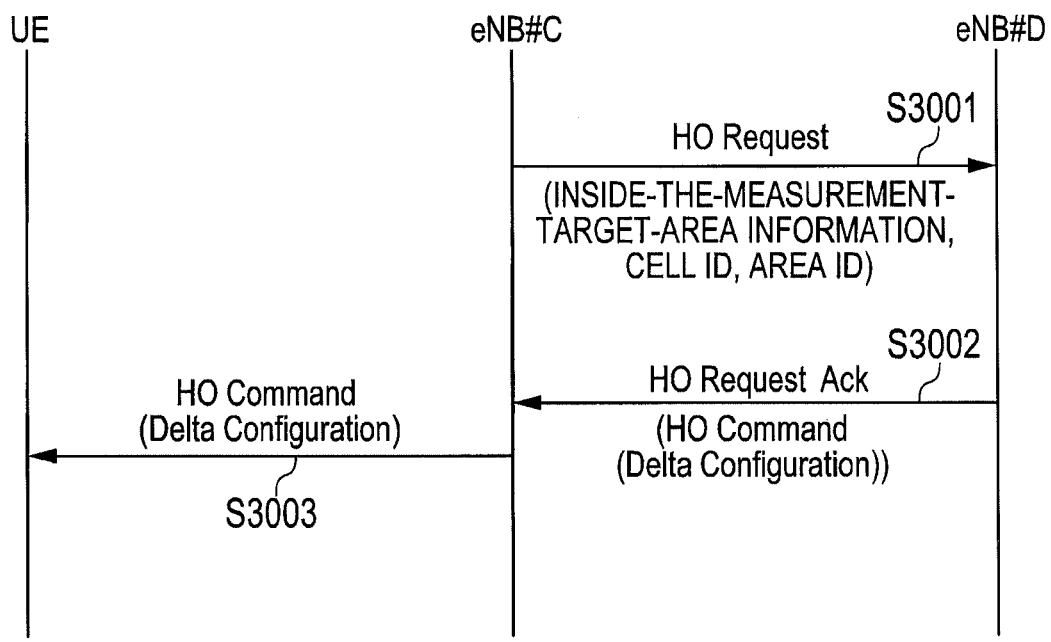
FIG. 5 is a sequence diagram illustrating an operation of the mobile communication system according to the first embodiment of the present invention.

Thirdly, with reference to FIG. 5, a description will be provided for an operation of the mobile communication system according to the present embodiment when the mobile station UE is handed over from the cell #C that lies inside the measurement-target area and is subordinate to the radio base station eNB#C to a cell #D outside the measurement-target area and is subordinate to a radio base station eNB#D.

As illustrated in FIG. 5, when the mobile station UE is in an RRC_Connected state in the cell #C, the radio base station eNB#C transmits "HO Request" to the radio base station eNB#D in step S3001.

Furthermore, the radio base station eNB#C may transmit inside-the-measurement-target-area information, which indicates that the cell #C is a cell that lies inside the measurement-target area, to the radio base station eNB#D through the "HO Request".

Alternatively, the radio base station eNB#C may transmit identification information (for example, a cell ID and an area ID) assigned to the cell #C to the radio base station eNB#D through the "HO Request".

In step S3002, the radio base station eNB#D generates "HO Command" to be transmitted to the mobile station UE in response to the received "HO Request", and transmits "HO Request Ack" including the "HO Command" to the radio base station eNB#C.

Furthermore, the radio base station eNB#D detects that the cell #C is a cell that lies inside the measurement-target area, based on the inside-the-measurement-target-area information or the identification information assigned to the cell #C.

As a consequence, the radio base station eNB#D may generate "Measurement Configuration (Delta Configuration)" for instructing to stop measuring and reporting a desired radio quality, and transmit the "Measurement Configuration (Delta Configuration)" the radio base station eNB#C through the "HO Command" in the "HO Request Ack".

In step S3003, the radio base station eNB#C transmits the "HO Command" including the "Measurement Configuration (delta configuration)" to the mobile station UE.

As a consequence, the mobile station UE is handed over to the cell #D outside the measurement-target area, and then stops measuring and reporting the desired radio quality.

In accordance with the mobile communication system according to the present embodiment, it is possible to cause an unspecific mobile station UE inside the measurement-target area to measure and report the desired radio quality.

The characteristics of the present embodiment as described above may be expressed as follows.

A first characteristic of the present embodiment is summarized in that a mobile communication method, in which a mobile station UE is handed over from a cell #A (a first cell) that lies outside an measurement-target area and is subordinate to a radio base station eNB#A (a first radio base station) to a cell #B (a second cell) that lies inside the measurement-target area and is subordinate to a radio base station eNB#B (a second radio base station), includes: a step A of transmitting, by the radio base station eNB#A, "HO Request (a handover request signal)" to the radio base station eNB#B; a step B of transmitting, by the radio base station eNB#B, "HO Request Ack (a handover request response signal)", which includes "HO Command" including "Measurement Configuration (instruction information)" for instructing to measure and report a desired radio quality, to the radio base station eNB#A; and a step C of transmitting, by the radio base station eNB#A, the "HO Command (Handover instruction signal)" including the "Measurement Configuration" to the mobile station UE.

In the first characteristic of the present embodiment, the radio base station eNB#A may transmit the "HO Request" including outside-the-measurement-target-area information indicating that the cell #A is a cell that lies outside the measurement-target area in the step A, and the radio base station eNB#B may transmit the "HO Request Ack" in response to the outside-the-measurement-target-area information in the step B.

In the first characteristic of the present embodiment, the radio base station eNB#A may transmit the "HO Request" including identification information (a cell ID or an area ID) assigned to the cell #A in the step A, and the radio base station eNB#B may transmit the "HO Request Ack" in response to the identification information assigned to the cell #A in the step B.

A second characteristic of the present embodiment is summarized in that a mobile communication method, in which a mobile station UE is handed over from a cell #B (a first cell) that lies inside an measurement-target area and is subordinate to a radio base station eNB#B (a first radio base station) to a cell #C (a second cell) that lies inside the measurement-target area and is subordinate to a radio base station eNB#C (a second radio base station), includes: a step of transmitting "Measurement Configuration" for instructing to measure and report a desired radio quality to the mobile station UE; a step of transmitting, by the radio base station eNB#B, "HO Request", which includes inside-the-measurement-target-area information indicating that a cell #B is a cell that lies inside the measurement-target area, to the radio base station eNB#C; a step of transmitting, by the radio base station eNB#C, "HO Request Ack" including "HO Command" not including "Measurement Configuration" to the radio base station eNB#B in response to the inside-the-measurement-target-area information; and a step of transmitting, by the radio base station eNB#B, the "HO Command" to the mobile station UE.

A third characteristic of the present embodiment is summarized in that a mobile communication method, in which a mobile station UE is handed over from a cell #B that lies inside an measurement-target area and is subordinate to a radio base station eNB#B to a cell #C that lies inside the measurement-target area and is subordinate to a radio base station eNB#C, includes: a step of transmitting "Measurement Configuration" for instructing to measure and report a desired radio quality to the mobile station UE; a step of transmitting, by the radio base station eNB#B, "HO Request", which includes identification information (a cell ID or an area ID) assigned to the cell #B, to the radio base station eNB#C; a step of transmitting, by the radio base station eNB#C, "HO Request Ack" including "HO Command" not including "Measurement Configuration" to the radio base station eNB#B in response to the identification information assigned to the cell #B; and a step of transmitting, by the radio base station eNB#B, the "HO Command" to the mobile station UE.

A fourth characteristic of the present embodiment is summarized in that a mobile communication method, in which a mobile station UE is handed over from a cell #C (a first cell) that lies inside an measurement-target area and is subordinate to a radio base station eNB#C (a first radio base station) to a cell #D (a second cell) outside the measurement-target area and is subordinate to a radio base station eNB#D (a second radio base station), includes: a step A of transmitting, by the radio base station eNB#C, "HO Request" to the radio base station eNB#D; a step B of transmitting, by the radio base station eNB#D, "HO Request Ack", which includes "HO Command" including "Measurement Configuration" for instructing to stop measuring and reporting a desired radio quality, to the radio base station eNB#C; and a step C of transmitting, by the radio base station eNB#C, the "HO Command" including the "Measurement Configuration" to the mobile station UE.

In the fourth characteristic of the present embodiment, the radio base station eNB#C may transmit the "HO Request" including inside-the-measurement-target-area information indicating that the cell #C is a cell that lies inside the measurement-target area in the step A, and the radio base station eNB#D may transmit the "HO Request Ack" in response to the inside-the-measurement-target-area information in the step B.

In the fourth characteristic of the present embodiment, the radio base station eNB#C may transmit the "HO Request" including identification information (a cell ID or an area ID) assigned to the cell #C in the step A, and the radio base station eNB#D may transmit the "HO Request Ack" in response to the identification information assigned to the cell #C in the step B.

Note that the operation of the O&M server, the mobile management node MME, the radio base station eNB, or the mobile station UE may be performed by hardware, a software module performed by a processor, or a combination thereof.

The software module may be arranged in a storage medium of an arbitrary format such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can write and read information into and from the storage medium. Such a storage medium may also be accumulated in the processor. Such a storage medium and processor may be arranged in an ASIC. The ASIC may be arranged in the O&M server, the mobile management node MME, the radio base station eNB, or the mobile station UE. Furthermore, such a storage medium and processor may be arranged in the O&M server, the mobile management node MME, the radio base station eNB, or the mobile station UE as discrete components.

Thus, the present invention has been explained in detail by using the above-described embodiments; however, it is obvious that for persons skilled in the art, the present invention is not limited to the embodiments explained herein. The present invention can be implemented as a corrected and modified mode without departing the gist and the scope of the present invention defined by the claims. Therefore, the description of the specification is intended for explaining the example only and does not impose any limited meaning to the present invention.

REFERENCE SIGNS LIST

UE . . . Mobile station
eNB . . . Radio base station
MME . . . Mobile management node

The invention claimed is:

1. A mobile communication method in which a mobile station is handed over from a first cell subordinate to a first radio base station to a second cell subordinate to a second radio base station, the method comprising:
   a step A of transmitting instruction information for instructing to measure and report a desired radio quality to the mobile station;
   a step B of transmitting, by the first radio base station, a handover request signal, which includes identification information assigned to the first cell, to the second radio base station;
   a step C of determining, by the second radio base station, whether or not the second cell is an area inside a measurement-target area, on the basis of the identification information assigned to the first cell; and
   a step D of notifying the mobile station of the instruction information, when it is determined that the second cell is the area inside the measurement-target area.

2. The mobile communication method according to claim 1, wherein in the step D, the instruction information is notified by a handover instruction signal to the mobile station.

3. A radio base station, which operates as a second radio base station in a mobile communication method in which a mobile station receiving instruction information for instructing to measure and report a desired radio quality is handed over from a first cell subordinate to a first radio base station to a second cell subordinate to a second radio base station, wherein the radio base station is configured:
   to receive a handover request signal including identification information assigned to the first cell from the first radio base station,
   to determine whether or not the second cell is an area inside a measurement-target area, on the basis of the identification information assigned to the first cell; and
   to notify the mobile station of the instruction information, when it is determined that the second cell is the area inside the measurement-target area.

4. The radio base station according to claim 3, wherein the radio base station is configured to notify the instruction information by a handover instruction signal to the mobile station.

* * * * *